Jan. 15, 1946.　　　C. GERST　　　2,392,984
CLUTCH STRUCTURE
Filed May 29, 1944　　　4 Sheets-Sheet 1

INVENTOR.
CHRIS GERST
BY Gustav A. Wolff
ATT.

Jan. 15, 1946.　　　　C. GERST　　　　2,392,984
CLUTCH STRUCTURE
Filed May 29, 1944　　　　4 Sheets-Sheet 2
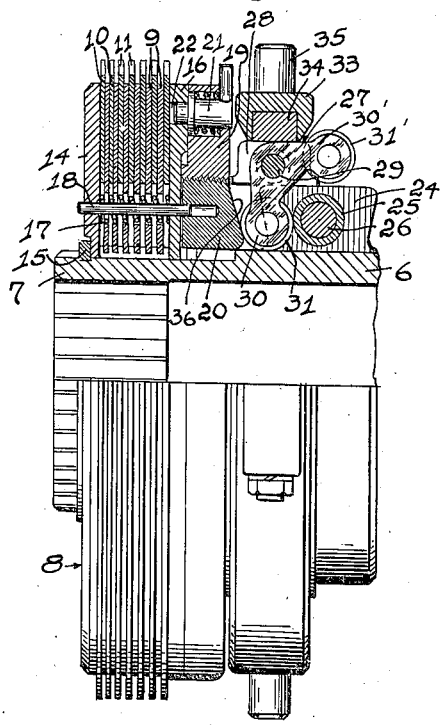
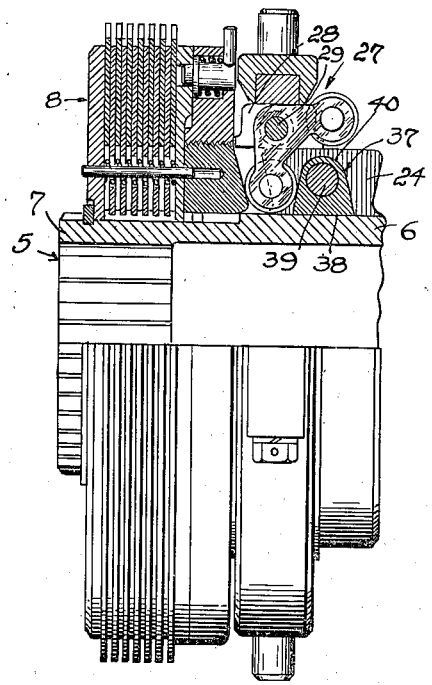
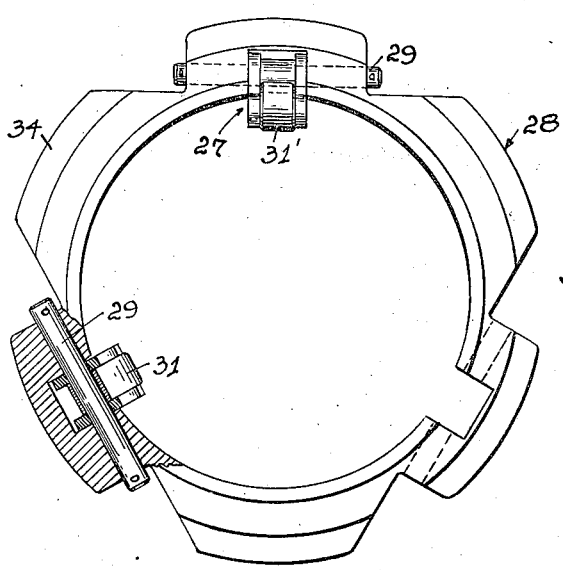
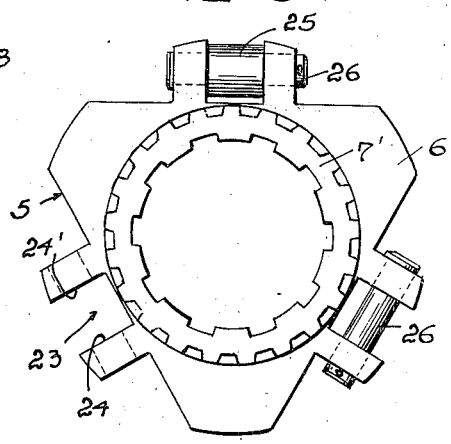
INVENTOR.
CHRIS GERST
BY
ATT.

Jan. 15, 1946. C. GERST 2,392,984
CLUTCH STRUCTURE
Filed May 29, 1944 4 Sheets-Sheet 3

INVENTOR.
CHRIS GERST
BY Gustav A. Wolff
ATT.

Jan. 15, 1946.   C. GERST   2,392,984
CLUTCH STRUCTURE
Filed May 29, 1944   4 Sheets-Sheet 4
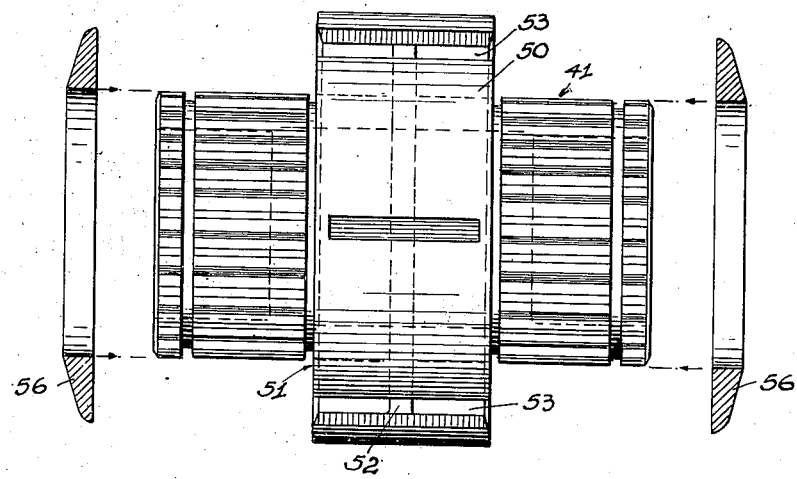
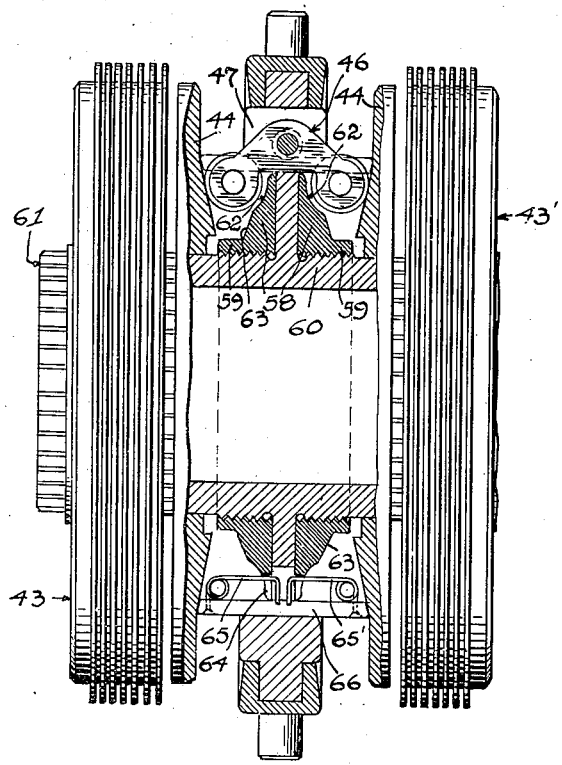
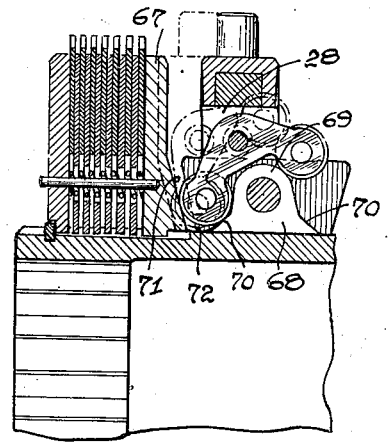
INVENTOR.
CHRIS GERST
BY Patented Jan. 15, 1946

2,392,984

UNITED STATES PATENT OFFICE 2,392,984

CLUTCH STRUCTURE

Chris Gerst, Dearborn, Mich., assignor to Transmission Specialties Company, Detroit, Mich., a partnership of Michigan Application May 29, 1944, Serial No. 537,874

12 Claims. (Cl. 192—69)

This invention relates to friction clutches in which independently rotatable driving and driven members are coupled with each other by a plurality of friction disks when these disks are brought into frictional cooperation by clutching means including backing and clamping plates for the disks and means for shifting the plates into clamping and releasing positions. Clutches of this type generally embody a hub, a casing, a shifting collar slidably mounted on the hub, and clutch actuating means including lever members coupled either with the hub, the casing or the shifting collar.

The present invention which refers particularly to clutch structures having the lever members of their clutch actuating means coupled with and supported by a shifting collar, has for its general object the provision of an improved clutch structure of the type referred to above which, in addition to the mounting of a shifting collar member on the clutch hub and pivotal mounting of clutch actuating lever members on the shifting collar member, includes backing and tripping means on the hub member arranged so as to be positioned inside of the shifting collar member to effect clutching and tripping movements of the clutch actuating lever members inside of the shifting collar member for efficient and quick clutching and releasing action of these members by short shifting movements of the collar member.

Another object of the invention is the provision of an improved clutch structure of the type referred to above, in which the backing and tripping means on the clutch hub are arranged within radial slots of the hub cut inwardly into an enlarged portion thereof, and in which the clutch actuating lever members are pivoted to the shifting collar member in areas above said radial slots for inward tilting of these levers and cooperation with the backing and tripping means when the shifting collar member is actuated for clutching and releasing operations.

A further object of the invention is the provision of an improved clutch structure of the type referred to above, in which the backing and tripping means for the clutch actuating lever members are positioned on the hub inside of the clutch hub encircling collar member, and in which these backing and tripping means have an inclined contact face forming with the inclined contact face of the customary clamping plate a V-shaped channel means cooperating with said clutch actuating lever means in clutching and releasing operations.

Still another object of the invention is the provision of an improved clutch structure of the type referred to above, in which the hub is formed with a slotted flange or rim circumferentially spaced from the hub body portion and connected therewith by wall means simultaneously acting as backing and tripping means, with the clutch actuating lever members aligned with the slots in said flange or rim for proper cooperation with said wall means in clutching and releasing operations.

Clutch structures built in accordance with the heretofore mentioned objects of the invention permit proper, quick and powerful clutching and releasing action of the clutch operating mechanism with relatively short strokes of the shifting collar, furthermore, and to a great extent, are self-locking due to substantially rectangular relation of stresses applied during clutching operations to the clutch actuating lever members and their shifting collar, and, finally, are self-adjustable so as to compensate for wear and tear on the friction disks of the clutch, as the V-shaped channel cooperating with the clutch actuating lever members permits such a compensation for wear by mere increase of the stroke of the shifting collar until the pivot points of these clutch actuating lever members are vertically above the V-shaped channel.

With the above and other incidental objects in view, the invention has other marked improvements and superiorities which radically distinguish it from presently known structures. These improvements or superior characteristics embodying certain novel features of construction are clearly set forth in the appended claims, and several embodiments of the invention are hereinafter shown with reference to the accompanying drawings forming part of the specification.

In the drawings:

Fig. 3 is a fragmentary sectional view of the clutch structure shown in Fig. 1 when in clutching position.

Fig. 4 is a side elevation, partly in section, of the shifting collar.

Fig. 5 is a side view of the hub.

Fig. 6 is a fragmentary sectional view similar to Fig. 3, showing a clutch structure with a somewhat differently constructed backing and tripping member.

Fig. 10 is a side elevation of the hub of the clutch structure shown in Fig. 7, with the backing and tripping rings of the hub disclosed at its opposite ends.

Figure 1:
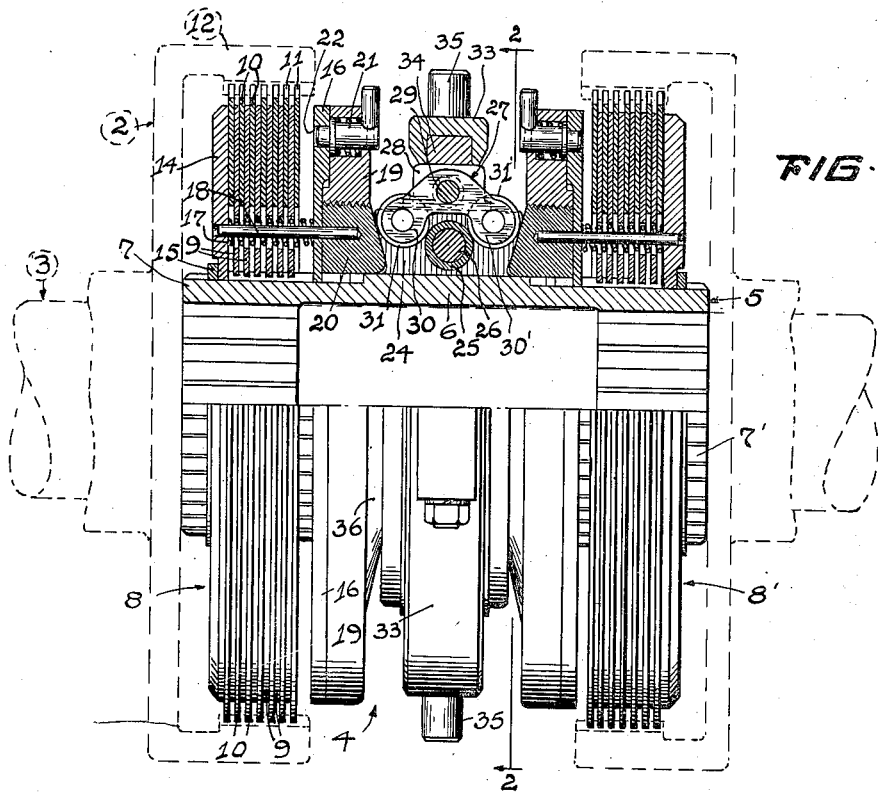
Fig. 1 is a sectional view, partly in elevation, of one form of a clutch constructed in accordance with the invention, the figure showing a dual arrangement of clutches adapted to be used for effecting changes in speed or a reversal in rotation of the driven member.
Figure 2:
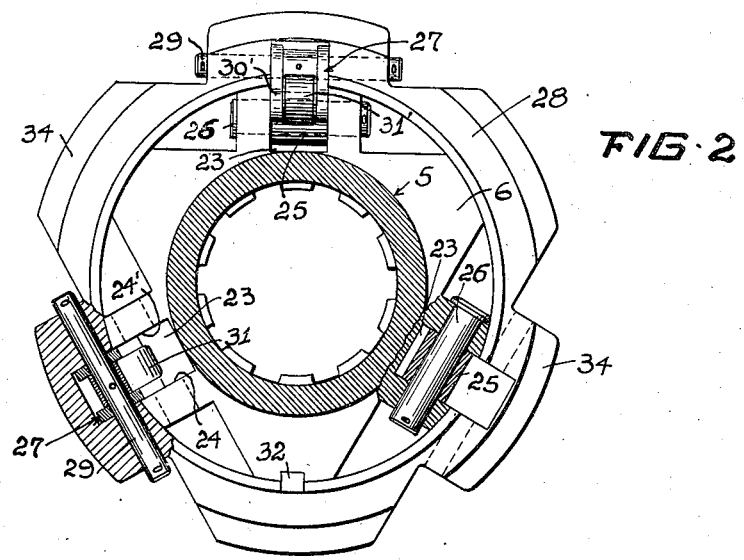
Fig. 2 is a cross sectional view, partly in elevation, of the assembled hub and shifting collar member of the clutch shown in Fig. 1, the section taken on line 2—2 of Fig. 1, showing mounting of the clutch actuating lever members in the collar member and of the backing and tripping members in the hub.
Figure 7:
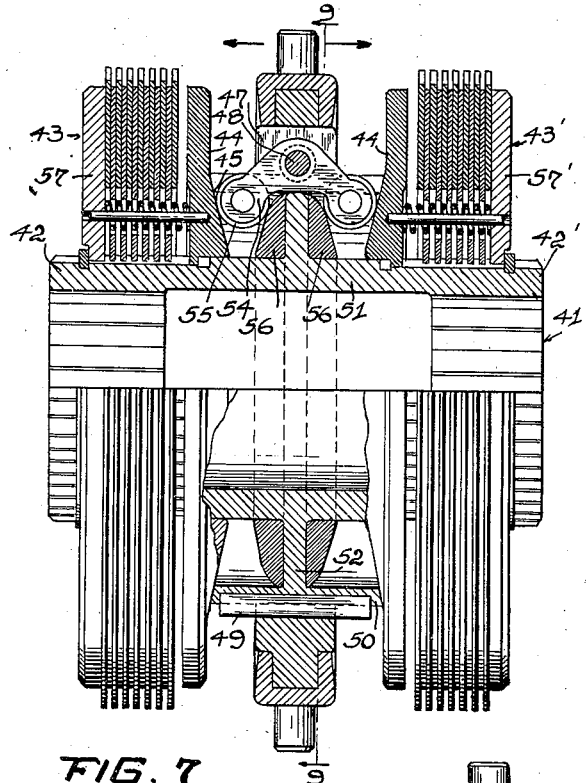
Fig. 7 is a sectional view, partly in elevation, of another form of a clutch constructed in accordance with the invention, the figure showing a hub arrangement having a rim portion forming the bearing support for the shifting collar and a wall portion supporting the rim portion and forming the backing and tripping means for the clutch actuating lever mechanism.
Figure 8:
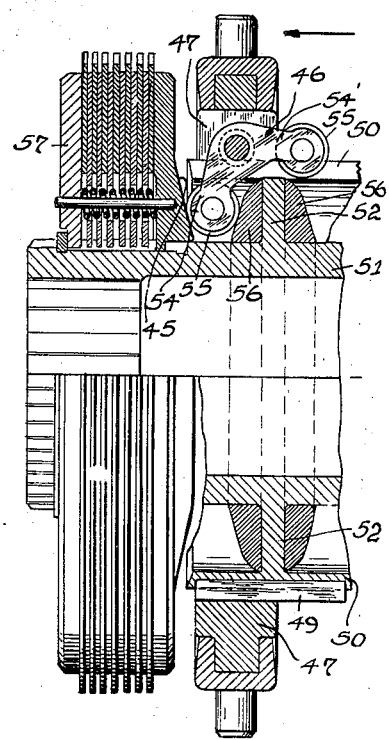
Fig. 8 is a fragmentary sectional view similar to the clutch structure shown in Fig. 7 when in clutching position.
Figure 9:
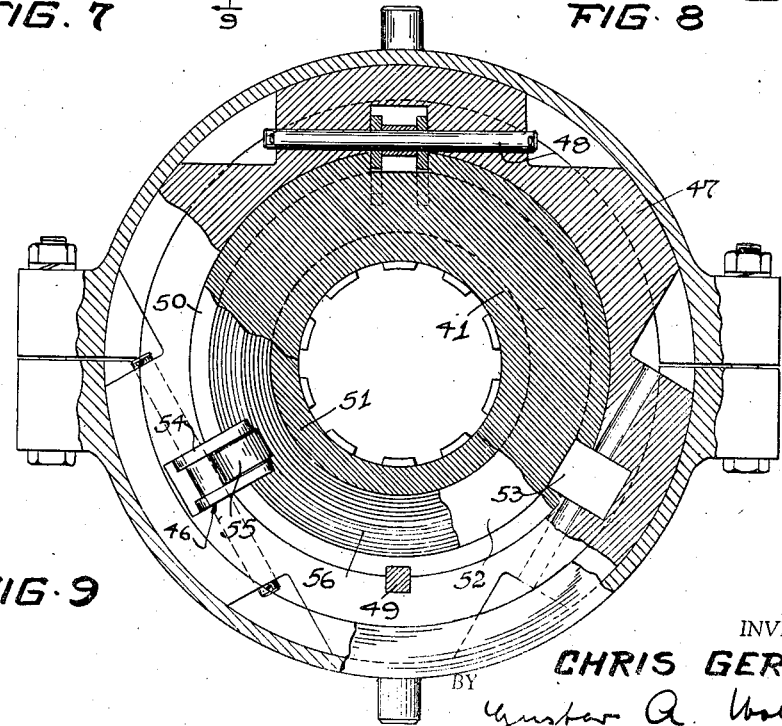
Fig. 9 is a cross sectional view, partly in elevation, through the clutch structure shown in Fig. 7, the section being taken on line 9—9 of said figure.

Fig. 11 is a sectional view, partly in elevation, of a clutch structure similar to the structure disclosed in Fig. 7, with the exception that the backing and tripping rings of the hub are threaded upon the hub to permit adjustment and compensation for excessive wear of the friction disks; and Fig. 12 is a fragmentary sectional view similar to Fig. 6, with a somewhat different backing and tripping member permitting self-adjustment and compensation for wear of the clutch disks, the figure disclosing in dash-dotted lines the amount of compensation attainable by increasing the stroke of the shifting collar.

Referring now more particularly to the structure shown in Figs. 1 through 5 of the drawings, reference numeral 2 designates a flywheel, the driving member of the construction, which member is suitably connected with a power source (not shown), and reference numeral 3 designates a shaft, the driven member of the construction. Members 2 and 3 are coupled with each other by a dual clutch construction 4 embodying an elongated hub 5 splined to the driven member, shaft 3, which hub includes an enlarged central portion 6 and mounts on its reduced opposite end portions 7, 7' identical clutch constructions 8, 8', only one of which will be described hereinafter. Each of these clutch constructions includes a plurality of friction driven disks 9 splined to the end portions of hub 5 and arranged thereon for axial movement with respect to hub 5. These friction driven disks 9 are alternately disposed with respect to a plurality of friction driving disks 10 which have their toothed peripheries 11 arranged in driving engagement with the toothed flanged portion 12 of flywheel 2 so as to permit axial movement of disks 10 with respect to said flanged portion 12. The thus related sets of friction driven disks 9 and friction driving disks 10 are forced into frictional driving engagement by a pair of clamping members embodying a backing plate 14 splined to hub 5 and prevented from endwise movement by a split ring 15 and a clamping or pressure plate 16 splined to hub 5 and axially shiftably arranged with respect thereto. These clamping members, backing plate 14 of which constitutes a fixed abutment, engage the assembly of disks 9 and 10 at its opposite sides and effect frictional driving engagement between these disks when the clamping or pressure plate 16 is shifted against the force of release springs 17 on guide pins 18 by a clutch actuating mechanism hereinafter to be described.

The clamping or pressure disk 16, as shown, is backed by an adjusting ring member 19 which is threadedly mounted on a floating ring 20 freely shiftably supported on hub 5. Adjusting ring member 19 which permits adjustment of the space between backing plate 14 and clamping plate 16 to maintain proper relationship between these plates in accordance with wear and tear on friction disks 9 and 10 in adjusted position of the clutch, is releasably engaged with plate 16 by a spring-pressed locking pin 21 on member 19, which pin effects locking of ring member 19 in cooperation with circumferentially disposed holes 22 in pressure or clamping plate 16.

The thus constructed clutches are shifted into driving position by a clutch actuating mechanism which is mounted on enlarged central hub portion 6. For such purpose, this central hub portion includes in its peripheral surface a plurality of equispaced radial slots 23, each of which has arranged between its opposite walls 24, 24' a roller member 25 mounted on a pin 26. Roller member 25 forms backing and tripping means for a dual clutch lever 27 which is pivotally supported by a collar member 28, a pivot pin 29 being used for this purpose, and carries in each of its bifurcated arms 30, 30' a roller 31, 31' respectively. Dual clutch lever 27 engages roller 25 when collar member 28, axially shiftably, secured to central hub portion 6 by a key 32, is shifted in opposite directions by a shifting collar 33 freely rotatably mounted on a peripheral rib 34 of collar member 28 and provided with trunnions 35 for engagement with a shifting fork not shown.

During clutching operations for clutch construction 8 shifting collar 33, and therewith collar member 28, are shifted toward the left (see Fig. 3), so that roller member 25 trips roller 31' on lever arm 30' and tilts lever arm 30 of dual clutch lever 27 toward the inclined contact surface 36 of floating ring 20. During this movement roller 31 on lever arm 30 engages contact surface 36 and roller member 25, shifts floating ring 20 with pressure or clamping plate 16 toward backing plate 14 to effect a frictional driving engagement between disks 9 and 10. In clutching position of clutch lever 27, the axis of its lever arm 30 is substantially rectangularly related to the axis of collar member 28 and, consequently, lever 27 in clutching position is self-locked.

Clutch releasing operations for clutch construction 8 are effected by shifting collar 33 and therewith collar member 28 toward the right, so that roller member 25 trips roller 31 and tilts dual clutch lever 27 back into neutral position, so that clamping or backing plate 16 can readily be shifted in an opposite direction by release springs 17. It is obvious that shifting of collar member 28 in the opposite directions will effect clutching and releasing operations on clutch construction 8', therefore, description of further clutch operations is superfluous. Instead of using as backing and tripping means a roller member, as shown in Figs. 1 through 5, such backing and tripping means may take the form of a shoe member, see Fig. 6. In this figure, the clutch structure is similar constructed as the previously described structure, with the exception that radial slots 23 in enlarged central hub portion 6 mount as tripping and backing means shoe members 37, each of which rests with its flat base 38 on the bottom walls of the respective slot 23 and is securely held in said slot by a pin 39. Preferably, shoe members 37 are formed with a rounded head portion 40 to facilitate tripping action on clutch lever 27.

Whereas clutch structures of the type shown in Figs. 1 through 6 necessitate adjustment means to permit compensation for wear and tear on their clutch disks, the clutch structures disclosed in Figs. 7 through 10 automatically compensate for such wear and tear. A clutch structure of this latter type embodies a hub 41, the splined end portions 42, 42' of which mount clutch constructions 43, 43' similar to the constructions 8, 8' shown in Fig. 1, with the exception that each of the constructions includes an integral clamping plate 44 having an inclined contact area 45 for dual clutch lever means 46 coupled to a collar member 47 by means of a pin 48. This collar member is slidably keyed by a key 49 to a circumferential flange or rim 50 surrounding the central portion 51 of hub 41 and is connected to said central portion by a radial wall 52. Flange or rim 50 is cut away at 53 opposite clutch lever means 46 to permit tilting of the arms 54, 54' of lever means 46 toward the axis of hub 41 and engagement of rollers 55 at the ends of these arms with the inclined contact areas 45 on pressure or clamping plates 44 when collar member 47 is shifted on flange or rim 50. Preferably, as shown, the radial wall 52 backs up frusto cone-shaped hardened steel rings 56 which provide backing and tripping means for dual clutch lever means 46 and which, together with the oppositely inclined contact surfaces of backing and clamping plates 44, form V-shaped channels to be entered by rollers 55 when collar member 47 is shifted on rim 50 in one or the other direction. The V-shape cross section of these channels provides self-compensation for wear on the clutch disks by increasing the stroke of collar member 47, an increase which automatically effects further shifting of clamping plates 44 toward the respective backing plates 57, 57'.

The modified form of clutch structure shown in Fig. 11 closely resembles the structure of Figs. 7 through 10, with the exception that the hardened frusto cone-shaped steel rings 58 include internally threaded portions 59 threadedly engaged with the threaded central portion 60 of hub 61 to permit axial shifting of these rings on hub 61 and therewith adjustment of these rings with respect to the clamping plates 44 of the respective clutch constructions 43 and 43'. To permit the desired shifting of steel rings 58 these rings include in their contact faces 63 circular grooves 62. Rings 58 are held in their adjusted positions by locking springs 65, 65' engaging notches 64 in the peripheral edges of these rings. Locking springs 65, 65' can readily be disengaged from their locking engagement with notches 64 by drawing their yielding levers into slot 66 in rim 50.

The modified form of clutch structure shown in Fig. 12 discloses a structure similar to the clutch structure shown in Fig. 6, with the exception that the clutch construction lacks adjustment means, that the clamping plate 67 resembles the clamping plates shown in the clutch structure of Fig. 7, and that the tripping and backing shoes 68 in cooperation with the inclined contact faces of the clamping plates effect self-compensation for wear and tear on the clutch disks. Each tripping and backing shoe 68 embodies a rounded head portion 69 and flaring contact faces 70, which latter, together with the inclined contact surfaces 71 of clamping plates 67, form channels 72 with a V-shape cross section permitting self-compensation for wear in the manner referred to above, all as indicated in Fig. 12 by dash-dotted lines indicating the possible wear on the clutch disks to be possibly compensated for by increase of the stroke of collar member 28.

Having thus described my invention, what I claim is:

1. In a clutch the combination of friction members attachable to separate rotary parts and adapted for driving engagement with each other, clamping means for effecting engagement of said friction members, a plurality of individual operating levers for said clamping means, each of said levers being mounted to swing freely toward the axis of said clutch, axially shiftable means encircling and individually pivotally supporting each of said levers, and means on one of said rotary parts encircled by said shiftable means, said last mentioned means contacting said levers during shifting operations and, in cooperation with said shiftable supporting means, effecting shifting of said levers into clutching and clutch releasing positions when said shiftable means is shifted in opposite directions.

2. In a clutch the combination of a hub having radial slots in its periphery, cooperating friction members shiftably arranged with respect to said hub, clamping means for said friction members, and means for actuating said clamping means including means on said hub arranged in the radial slots thereof, a shiftable collar member on said hub, and operating lever means individually pivoted to said collar member and encircled thereby, said means on said hub being arranged in said slots and encircled by said collar member for cooperation with said operating lever means in shifting same to clutch engaging and clutch releasing positions when said collar member is shifted in opposite directions.

3. A clutch as described in claim 2, wherein said means on said hub each consists of a roller on a pin mounted in the opposite walls of the respective slot.

4. A clutch as described in claim 2, wherein said means on said hub each consists of a shoe having a rounded head portion and diverging side walls.

5. In a clutch a hub, friction clutch structures mounted on opposite end portions of said hub, and actuating means for said clutch structures mounted on the central portion of said hub, said actuating means including a collar member shiftably arranged on said central portion, clutch operating lever means arranged within said collar means and pivotally coupled therewith, and means mounted on said hub opposite said lever means and encircled by said collar member, said means on said hub being arranged opposite said operating lever means for cooperation therewith in shifting same to clutch engaging and clutch releasing positions for each of said clutch structures when said collar member is shifted in opposite directions.

6. A clutch as described in claim 5, wherein the central portion of said hub includes radial slots in its periphery, wherein said means on said hub are mounted in said radial slots, and wherein said clutch operating lever means consist of dual clutch lever means pivotally supported by said collar member so that the arms of said lever means extend into said slots and cooperate with said means in said slots during clutch engaging and releasing operations when said collar member is shifted in opposite directions.

7. In a clutch the combination of a hub, cooperating friction members shiftably arranged with respect to said hub, clamping means for said friction members including a clamping plate having an inclined end face and means for actuating said clamping means, said actuating means embodying means mounted on said hub and having an inclined end face opposite the end face of said clamping plate to provide a V-shaped slot therewith, a collar member shiftably mounted on said hub, and operating lever means encircled by and coupled with said collar member, said collar member cooperating with said means on said hub in shifting said operating lever means into and out of said V-shaped slot during clutch engaging and disengaging operations.

8. In a clutch the combination of a hub, cooperating friction members shiftably arranged with respect to said hub, clamping means for said friction members, and means for actuating said clamping means, said hub including a main body, rim-like sections encircling said main body in spaced relation and connected therewith by a wall integrally extended from said main body, and said actuating means including a collar member slidably and non-rotatably mounted on said rim-like sections, and operating lever means pivoted to said collar member and including lever arm means adapted to be shifted between adjoining rim-like sections toward said wall for cooperation therewith in clutch engaging and disengaging operations when said collar member is shifted in opposite directions.

9. In a clutch the combination of a hub embodying a main body portion and a rim portion encircling said body portion and connected therewith by a wall, cut-out portions in said rim portion parallel to its axis, cooperating friction members shiftably arranged with respect to said main body, clamping means for said friction members, and actuating means for said clamping means, said actuating means including a collar member slidably and non-rotatably mounted on said rim portion, and operating lever means encircled by and pivoted to said collar member to effect tilting of said lever means through said cut-out portions toward said wall by actuation of said collar member and therewith actuation of said clamping means by said lever means.

10. A clutch as described in claim 9, wherein said clamping means includes a clamping plate having an inclined end face, and wherein said wall backs up a ring-shaped contact member forming together with said inclined face of said clamping means a channel of substantially V-shaped cross section for cooperation with said operating lever means in clutch engaging and releasing operations.

11. A clutch as described in claim 9, wherein the body portion of the hub axially adjustably mounts a ring-shaped backing and tripping member for said operating lever means which backing and tripping member cooperates with said collar member in shifting said operating lever means into clutch engaging and releasing positions when said collar member is shifted in opposite directions.

12. In a clutch a hub, clutching structures at opposite ends of said hub, and clutch actuating means for selective actuation of either of said clutching structures, said actuating means including means mounted on the central portion of said hub, a dual clutch lever arranged substantially opposite to said means on said hub, and shiftable collar means on said hub, said collar means pivotally supporting said dual clutch lever and encircling same, and said collar means cooperating with said means on said hub in effecting tilting of said dual clutch lever into clutching and clutch releasing positions for either of said clutching structures, when said collar means is shifted in opposite directions.

CHRIS GERST.